United States Patent
Saikyo et al.

(10) Patent No.: US 11,747,815 B2
(45) Date of Patent: Sep. 5, 2023

(54) LIMITING FUNCTION OF A VEHICLE CONTROL DEVICE RELATED TO DEFECTIVE IMAGE

(71) Applicant: HONDA MOTOR CO., LTD., Tokyo (JP)

(72) Inventors: Marina Saikyo, Wako (JP); Kanichi Koyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 267 days.

(21) Appl. No.: 17/212,541

(22) Filed: Mar. 25, 2021

(65) Prior Publication Data

US 2021/0302977 A1     Sep. 30, 2021

(30) Foreign Application Priority Data

Mar. 30, 2020   (JP) ................. 2020-059897

(51) Int. Cl.
*G05D 1/02*      (2020.01)
*B60W 30/18*     (2012.01)
*B60W 60/00*     (2020.01)

(52) U.S. Cl.
CPC ......... *G05D 1/0214* (2013.01); *G05D 1/0246* (2013.01); *B60W 30/18163* (2013.01); *B60W 60/001* (2020.02); *B60W 2555/60* (2020.02); *G05D 2201/0213* (2013.01)

(58) Field of Classification Search
CPC .............. G05D 1/0214; G05D 1/0246; G05D 2201/0213; B60W 30/18163; B60W 60/001; B60W 2555/60
See application file for complete search history.

(56) References Cited

U.S. PATENT DOCUMENTS

| | | | |
|---|---|---|---|
| 11,001,271 B2 * | 5/2021 | Sakamoto | G08G 1/16 |
| 2017/0232974 A1 | 8/2017 | Nishida | |
| 2018/0349716 A1 * | 12/2018 | Park | G06F 18/22 |
| 2019/0061775 A1 * | 2/2019 | Emura | B60W 50/0205 |
| 2019/0068962 A1 * | 2/2019 | Van Schoyck | H04N 17/002 |
| 2019/0369635 A1 * | 12/2019 | Kobayashi | G05D 1/0246 |
| 2020/0090322 A1 * | 3/2020 | Seo | G06V 10/82 |

(Continued)

FOREIGN PATENT DOCUMENTS

JP      2016-095831 A     5/2016

*Primary Examiner* — Hunter B Lonsberry
*Assistant Examiner* — Harrison Heflin
(74) *Attorney, Agent, or Firm* — Rankin, Hill & Clark LLP

(57) ABSTRACT

A vehicle control device includes an information acquisition unit acquiring information on the frontward image including the traveling road surface of the host vehicle; a recognition unit recognizing the traveling environment of the host vehicle based on the frontward image acquired by the information acquisition unit; and the autonomous driving control unit performing control of the autonomous driving including at least one of a speed control and a steering control of the host vehicle based on the traveling environment recognized by the recognition unit, wherein the recognition unit includes the extraction unit extracting a defective image in the frontward image; and the autonomous driving control unit limits functions related to the defective image among the plurality of functions involved in the autonomous driving when the defective image is extracted by the extraction unit.

4 Claims, 8 Drawing Sheets

(56) References Cited

U.S. PATENT DOCUMENTS

| | | | |
|---|---|---|---|
| 2021/0192745 A1* | 6/2021 | Kahlbaum | G06T 3/4015 |
| 2021/0201464 A1* | 7/2021 | Tariq | G06V 20/56 |
| 2021/0300317 A1* | 9/2021 | Ueda | B60Q 1/1469 |

* cited by examiner

FIG. 3
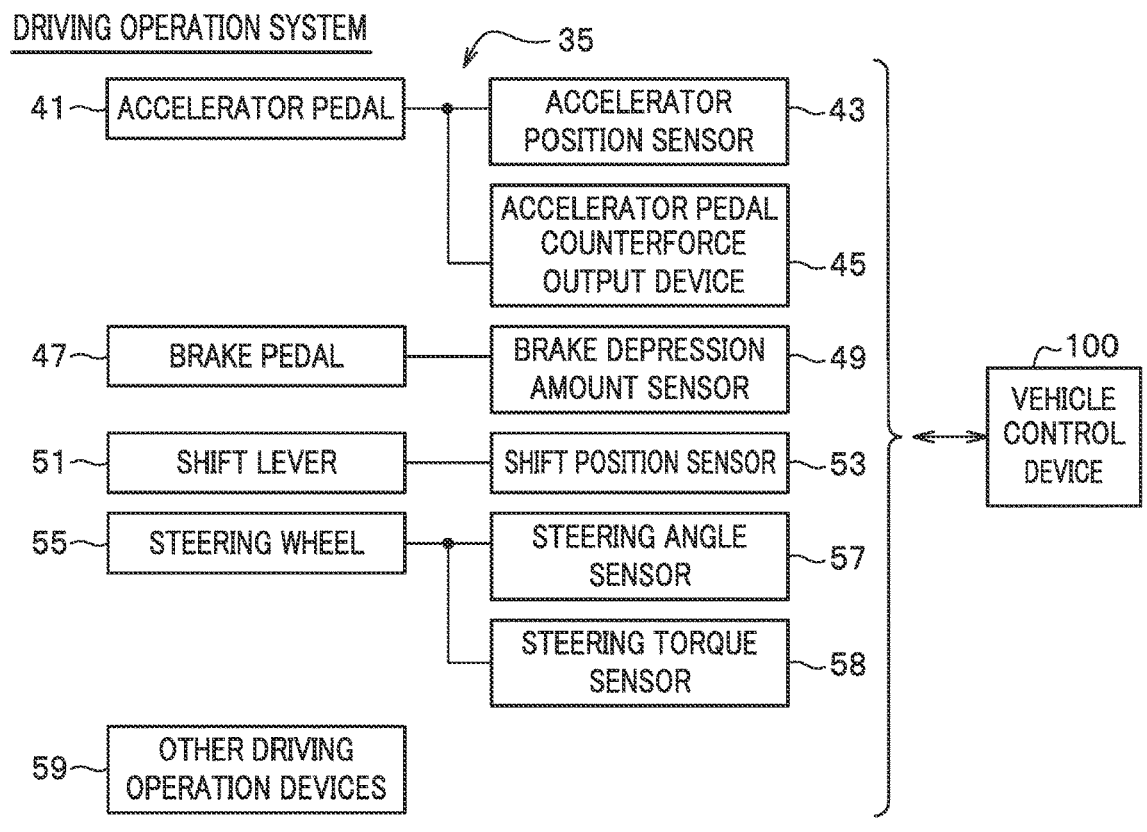
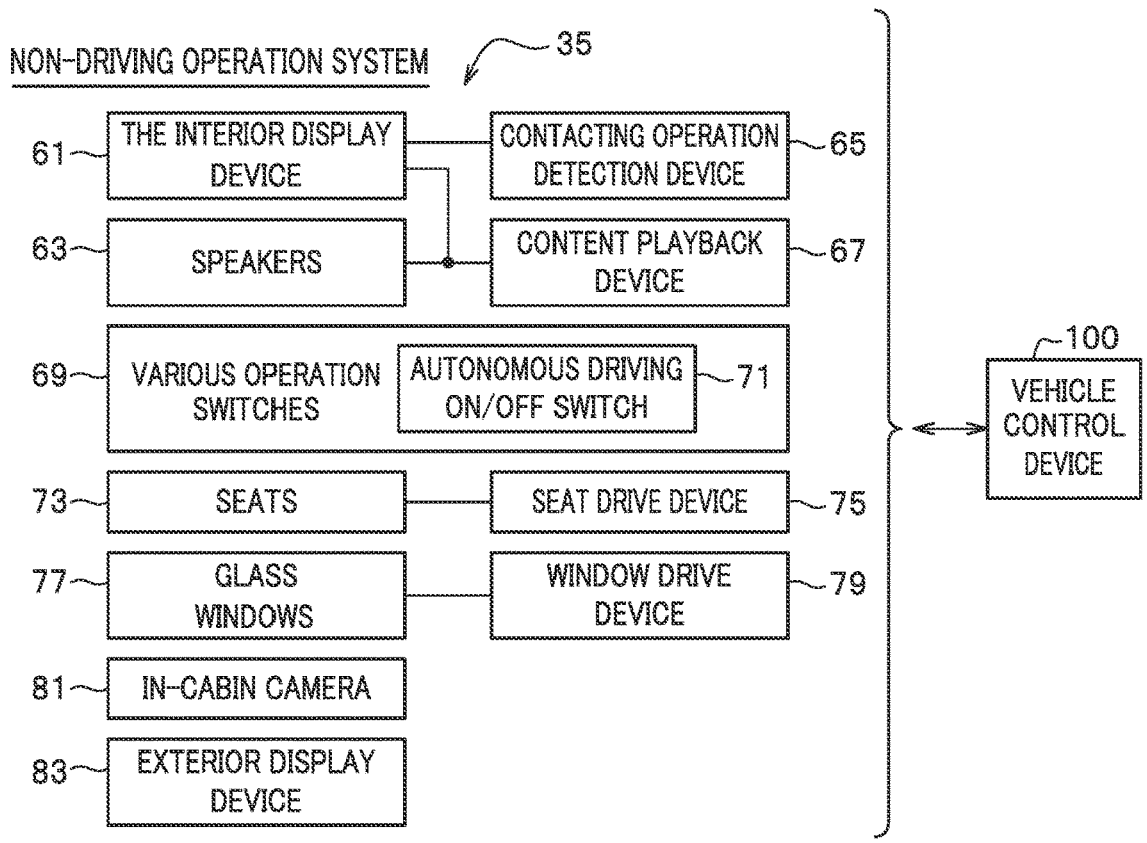

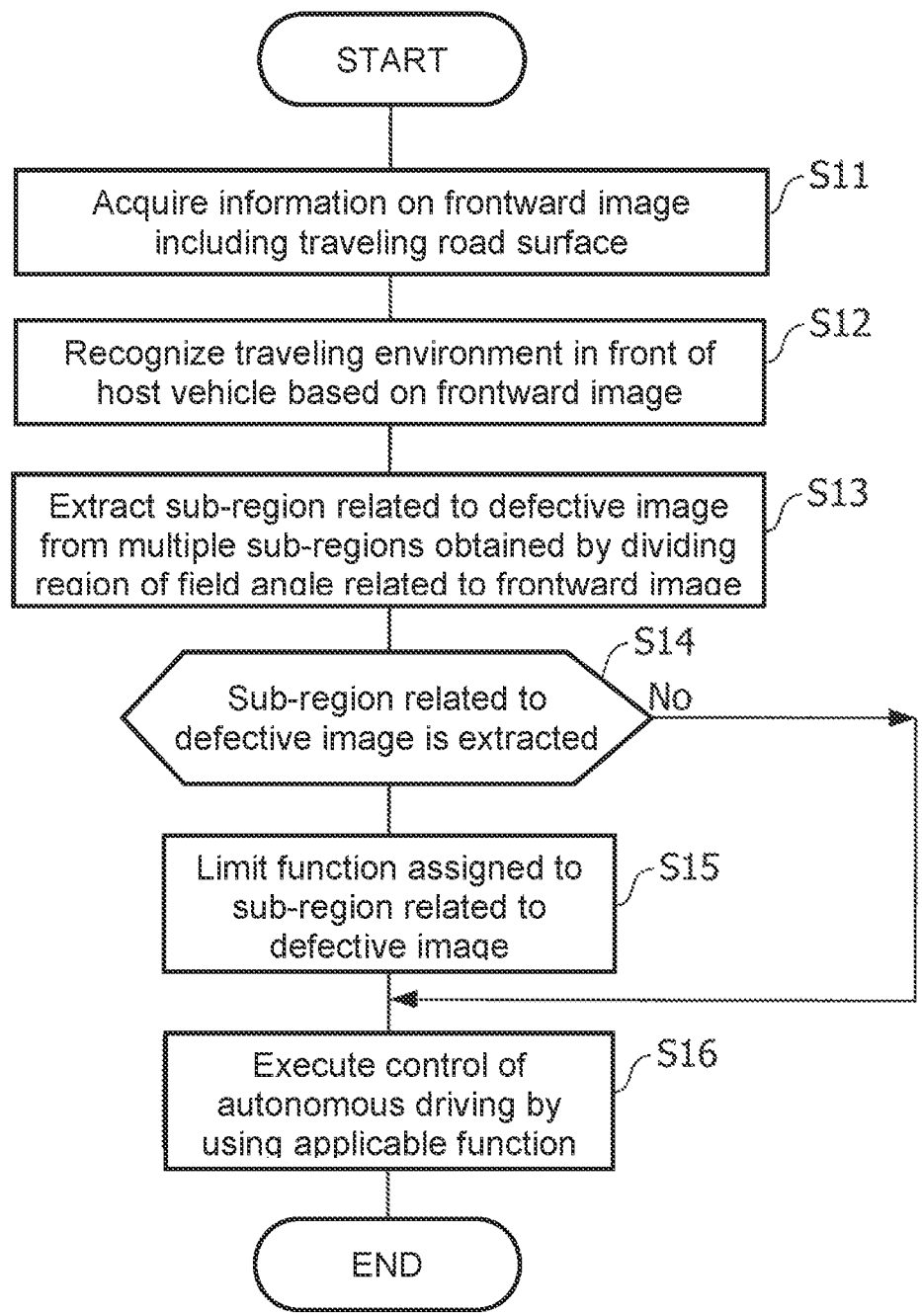

LIMITING FUNCTION OF A VEHICLE CONTROL DEVICE RELATED TO DEFECTIVE IMAGE

CROSS REFERENCE TO RELATED APPLICATIONS

This application claims benefit of foreign priority to Japanese Patent Application No. JP2020-059897, filed Mar. 30, 2020, which is incorporated by reference in its entirety."

TECHNICAL FIELD

The present invention relates to a vehicle control device capable of appropriately controlling a travelling of an autonomous vehicle.

BACKGROUND

Recently, so-called autonomous vehicles are gradually becoming widespread, which autonomous vehicle has a driving support function and an autonomous driving function in order to achieve safe and comfortable driving of the vehicle while reducing burden on a driver.

As an example of the autonomous driving technique, for example, Patent Literature 1 discloses an invention of an autonomous driving vehicle that achieves autonomous driving based on sensing information detected by a sensor. This autonomous driving car is provided with a driving support system including a driving support ECU. In this driving support system, detection capability of the sensor is evaluated by a detection capability evaluation unit of a center based on the sensing information transmitted from the driving support ECU. From the detection capabilities of the sensors respectively evaluated based on the sensing information for the multiple vehicles and positions where the sensing information is detected, a degradation region identification unit identifies a degraded region where the sensor's detection capability degrades. Then, a distribution unit transmits the information of the identified degradation region to the driving support ECU. Based on the received information on the degradation region, the driving support ECU stops the autonomous driving when the host vehicle is located in the degradation region.

According to the vehicle control system according to Patent Literature 1, for example, in an external world region (poor visibility area) where the detection capability of an external sensor used for the autonomous driving tends to decrease, the autonomous driving is able to be stopped faster than the detection capability of the sensor actually decreases.

CITATION LIST

Patent Literature

[PTL 1] Japanese Unexamined Patent Publication No. 2016-095831

SUMMARY OF INVENTION

Problems to be Solved

In the driving support system according to Patent Literature 1, for example, in a poor visibility area such as a backlight area and an area near a tunnel entrance/exit (see paragraph number 0117 of Patent Literature 1), if a recognition capability of a traveling environment based on a frontward image of the host vehicle taken by a camera is presumed to deteriorate, the autonomous driving is stopped.

However, the functions involved in autonomous driving are diverse in various fields such as CMBS (collision mitigation braking), ACC (adaptive cruise control), and LKAS (lane keeping support system). In addition, among modes in which the recognition capability of the traveling environment based on the frontward image of the host vehicle is degraded, it is able to be assumed that not all functions involved in the above-described wide range of autonomous driving need to be stopped.

The present invention is made in view of the above backgrounds, and it is an object of the present invention to provide a vehicle control device that allows the functions related to the autonomous driving to keep operating as long as possible, even when the recognition capability of the traveling environment based on the frontward image of the host vehicle is degraded.

Solution to Problems

In order to solve the above problem, a vehicle control device according to a first aspect of the invention includes an information acquisition unit that acquires information on a frontward image including a traveling road surface of a host vehicle, a recognition unit that recognizes a traveling environment of the host vehicle based on the frontward image acquired by the information acquisition unit, and an autonomous driving control unit that controls autonomous driving including at least one of a speed control and a steering control of the host vehicle based on the traveling environment recognized by the recognition unit, wherein the recognition unit includes an extraction unit that extracts a defective image among the frontward images, and the autonomous driving control unit has a main function of limiting functions related to the defective image among a plurality of functions involved in the autonomous driving if the recognition unit extracts the defective image.

Effect of Invention

According to the aspects of the invention, even if the recognition capability of the traveling environment based on the frontward image of the host vehicle is deteriorated, the functions related to the autonomous driving is able to be continued as much as possible.

BRIEF DESCRIPTION OF DRAWINGS

FIG. 3 is a schematic configuration diagram of an HMI provided in a vehicle control device.

FIG. 6 is a flowchart for explaining an operation of the vehicle control device.

DESCRIPTION OF EMBODIMENT

Figure 1:
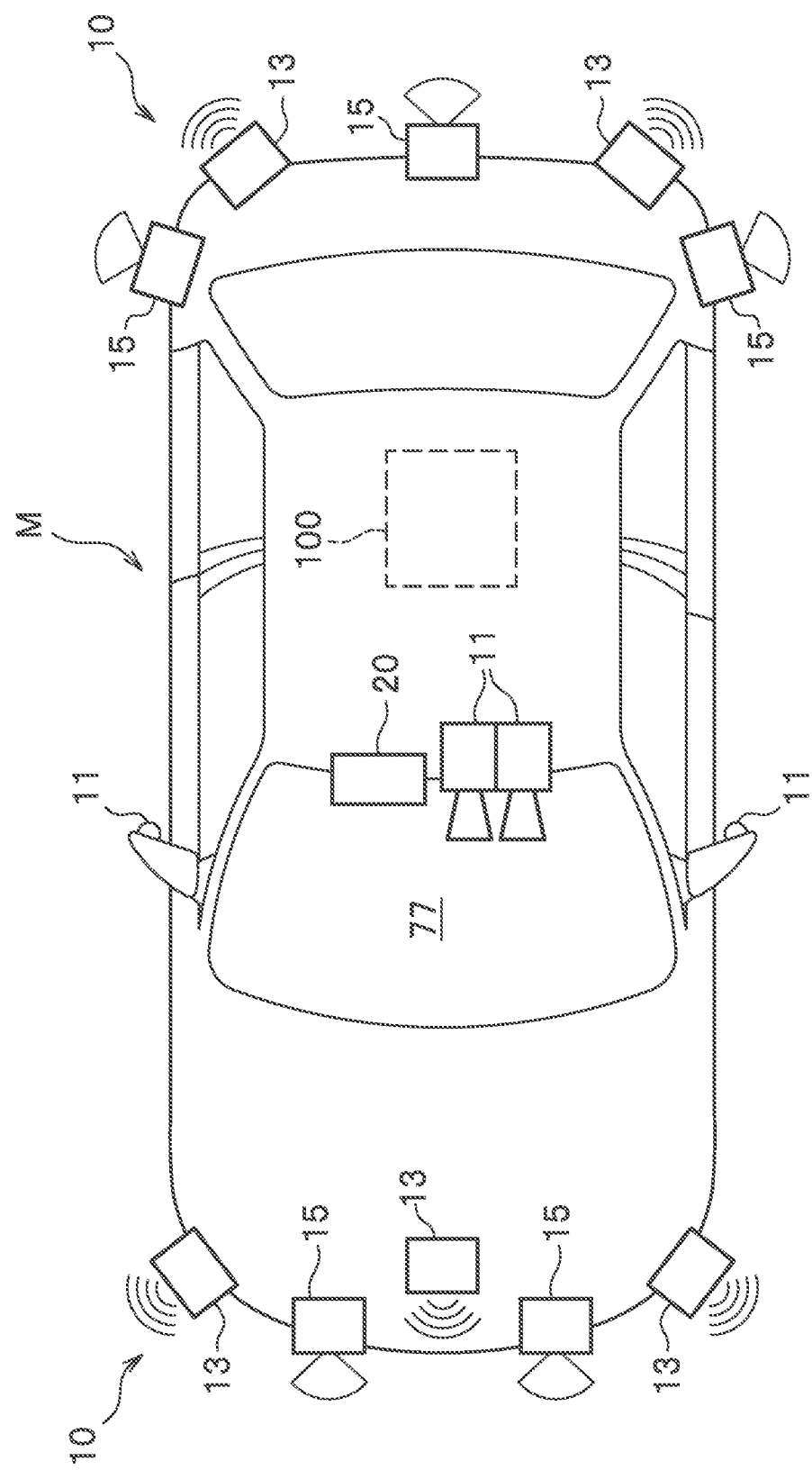
FIG. 1 is an overall configuration diagram of an autonomous driving vehicle including a vehicle control device according to an embodiment of the present invention.

A vehicle control device according to embodiments of the present invention is hereinafter described in detail with reference to the drawings.

Note that, in the drawings be presented below, members having the same function are denoted by the same reference sign. Moreover, the sizes and shapes of members may be changed or exaggerated and schematically illustrated for convenience of explanation.

When the terms "left" and "right" are used in relation to a host vehicle M in the description of the vehicle control devices according to the embodiments of the present invention, the front side of the host vehicle M in the direction of advance is the reference direction. Specifically, in a case where the host vehicle M is, for example, right-hand drive, the driver's seat side is referred to as the right side, and the passenger's seat side is referred to as the left side.

<Configuration of Host Vehicle M>

First of all, a configuration of an autonomous driving vehicle (hereinafter also referred to as "host vehicle") M including a vehicle control device 100 according to an embodiment of present invention is described with reference to FIG. 1. An autonomous vehicle of the presentment embodiment is a vehicle that has a driving support function and an automatic driving function, and is assumed to be an "autonomous driving vehicle" that has autonomous driving levels 1 to 5 according to the definition of SAE (Society of Automotive Engineers) International's document J3016.

FIG. 1 is an entire configuration diagram of the autonomous driving vehicle M including the vehicle control device 100 according to the embodiment of the present invention.

As illustrated in FIG. 1, the host vehicle M equipped with the vehicle control device 100 according to the embodiment of the present invention is an automobile, such as a two-wheeled, three-wheeled, or four-wheeled automobile, for example.

The host vehicle M includes an automobile with an internal combustion engine such as a diesel engine or a gasoline engine as a power source, an electric automobile with an electric motor as a power source, a hybrid automobile with both an internal combustion engine and an electric motor, and the like. Of these, the electric automobile is driven using electric power discharged from a cell such as a secondary cell, a hydrogen fuel cell, a metal fuel cell, or an alcohol fuel cell, for example.

As illustrated in FIG. 1, the host vehicle M is equipped with: an external sensor 10 having a function of detecting outside information on targets including objects and signs present around the host vehicle M; a navigation device 20 having a function of mapping the current position of the host vehicle M onto a map, guiding the host vehicle M to a destination through a route, and so on; and the vehicle control device 100 having a function of controlling autonomous driving of the host vehicle M including the steering and the acceleration and deceleration of the host vehicle M and so on.

These devices and instruments are configured such that they are connected so as to be capable of communicating data to each other through a communication medium such as a controller area network (CAN), for example.

Note that the "vehicle control device" may include other components (such as the external sensor 10 and an HMI 35) in addition to the components of the "vehicle control device 100" according to this embodiment.

<External Sensor 10>

The external sensor 10 is configured of cameras 11, radars 13, and lidars 15.

The cameras 11 have an optical axis orientated toward the front side of the host vehicle and tilted obliquely downward, and has a function of capturing an image in the direction of advance of the host vehicle M. In an example, complementary metal oxide semiconductor (CMOS) cameras, charge coupled device (CCD) cameras, or the like is able to be used as the cameras 11 as appropriate. The cameras 11 are provided near the rearview mirror (not illustrated) inside the cabin of the host vehicle M and on a front portion of a right door and a front portion of a left door outside the cabin of the host vehicle M, or the like.

The cameras 11 repetitively capture images of, for example, a front side in the direction of advance, a right rear side, and a left rear side relative to the host vehicle M on a periodic basis. In this embodiment, the camera 11 provided near the rearview mirror is a pair of monocular cameras arranged side by side. The camera 11 may be a stereo camera.

The pieces of image information on the front side in the direction of advance, the right rear side, and the left rear side relative to the host vehicle M captured by the cameras 11 are transmitted to the vehicle control device 100 through the communication medium.

The radars 13 have a function of obtaining distribution information on targets including a leading vehicle being a following target traveling ahead of the host vehicle M by emitting radar waves to the targets and receiving the radar waves reflected by the targets, the distribution information including the distances to the targets and the orientations of the targets. Laser beams, microwaves, millimeter waves, ultrasonic waves, or the like is able to be used as the radar waves as appropriate.

In this embodiment, five radars 13 are provided, three on the front side and two on the rear side, as illustrated in FIG. 1. The target distribution information obtained by the radars 13 is transmitted to the vehicle control device 100 through the communication medium.

The lidars 15 (Light Detection and Ranging) have a function of detecting the presence of a target and the distance to a target by, for example, measuring the time taken to detect scattered light of emitted light. In this embodiment, five lidars 15 are provided, two on the front side and three on the rear side, as illustrated in FIG. 1. The target distribution information obtained by the lidars 15 is transmitted to the vehicle control device 100 through the communication medium.

<Navigation Device 20>

The navigation device 20 is configured of a global navigation satellite system (GNSS) receiver, map information (navigation map), a touchscreen-type interior display device 61 functioning as a human machine interface (HMI), speakers 63 (see FIG. 3 for these two), a microphone, and so on. The navigation device 20 serves to locate the current position of the host vehicle M with the GNSS receiver and also to derive a route from the current position to a destination designated by the user.

The route derived by the navigation device 20 is provided to a target lane determination unit 110 (described later) of the vehicle control device 100. The current position of the host vehicle M may be identified or complemented by an inertial navigation system (INS) utilizing the outputs of a vehicle sensor 30 (see FIG. 2). Also, while the vehicle control device 100 is executing a manual driving mode, the navigation device 20 navigates through a route to a destination by using sound and voice or by displaying a map.

Note that the function of locating the current position of the host vehicle M may be provided independently of the navigation device 20. Also, the navigation device 20 may be implemented by a function of a terminal device such as a smartphone or tablet carried by the user, for example. In this case, information is transmitted and received between the terminal device and the vehicle control device 100 via wireless or wired communication.

<Vehicle Control Device 100 and its Peripheral Components>

Next, the vehicle control device 100 and its peripheral components mounted on the host vehicle M according to an embodiment of the present invention is described with reference to FIG. 2.

Figure 2:
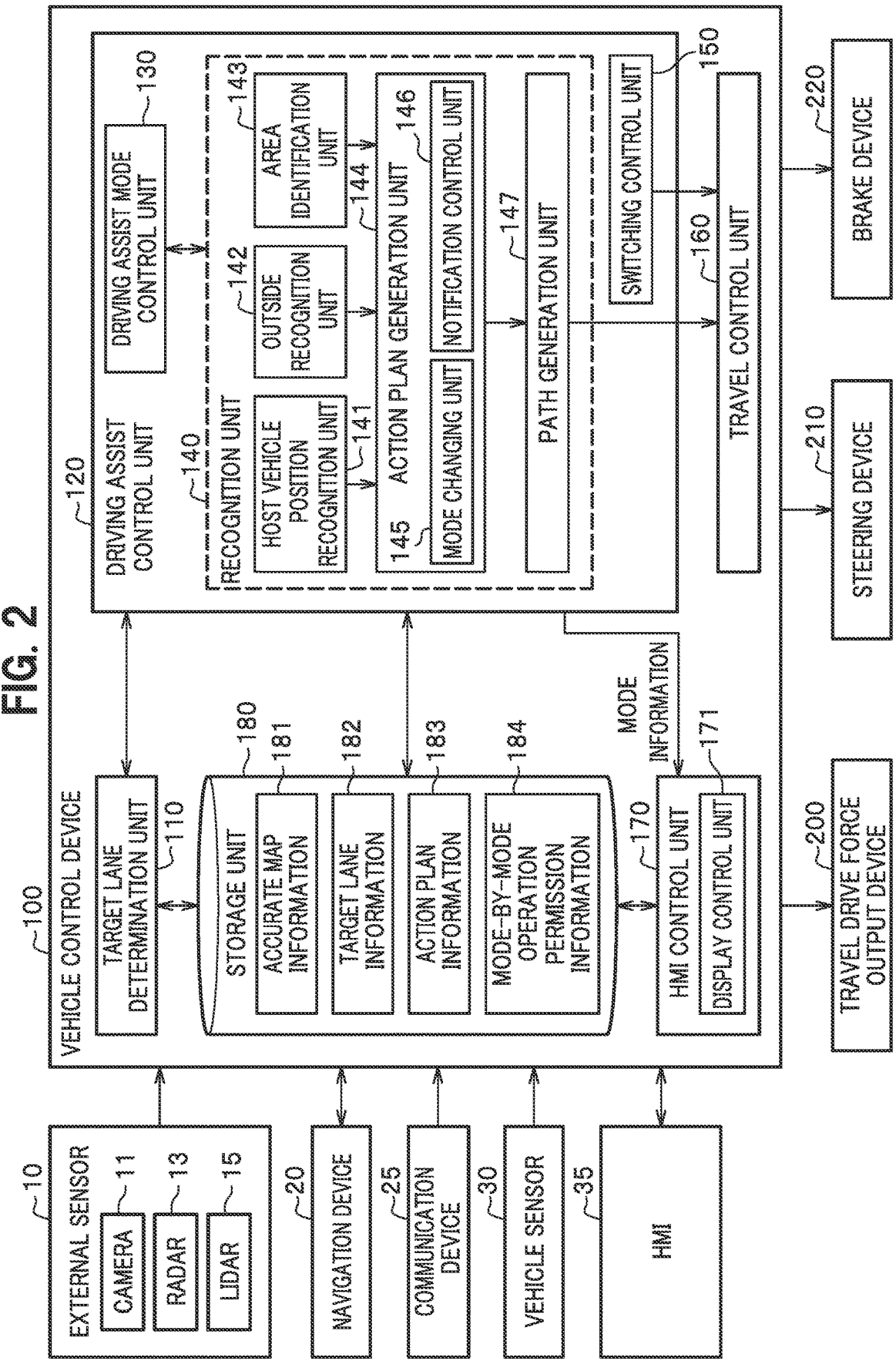
FIG. 2 is a functional block configuration diagram showing a vehicle control device including the vehicle control device according to the embodiment of the present invention and a configuration of peripheral units thereof.

FIG. 2 is a functional block configuration diagram illustrating the vehicle control device 100 and its peripheral components according to the embodiment of the present invention.

As illustrated in FIG. 2, the host vehicle M is equipped with a communication device 25, the vehicle sensor 30, the HMI 35, a travel drive force output device 200, a steering device 210, and a brake device 220, as well as the above-described external sensor 10, navigation device 20, and vehicle control device 100.

The communication device 25, the vehicle sensor 30, the HMI 35, the travel drive force output device 200, the steering device 210, and the brake device 220 are configured such that they are connected to the vehicle control device 100 so as to be capable of communicating data to and from the vehicle control device 100 through the communication medium.

<Communication Device 25>

The communication device 25 has a function of performing communication through a wireless communication medium such as a cellular network, a Wi-Fi network, Bluetooth (registered trademark), or a dedicated short-range communication (DSRC), for example.

The communication device 25 wirelessly communicates with, for example, an information providing server of a system that monitors the traffic situations of roads, such as the Vehicle Information and Communication System (VICS) (registered trademark), and obtains traffic information indicating the traffic situation of the road which the host vehicle M is currently traveling or a road which the host vehicle M is traveling. The traffic information contains pieces of information such as information on congestion ahead, information on the times required to pass through congested areas, information on accidents, failed vehicles, and construction, information on speed limitations and lane closures, information on the locations of parking lots, and information on the availability of parking lots and rest areas.

The communication device 25 may obtain the traffic information by, for example, communicating with a radio beacon provided on a side margin of the road or the like or performing vehicle-to-vehicle communication with another vehicle traveling around the host vehicle M.

The communication device 25 also wirelessly communicates with, for example, an information providing server of the Traffic Signal Prediction Systems (TSPS) and obtains traffic signal information on traffic lights provided on the road which the host vehicle M is currently traveling or a road which the host vehicle M is traveling. The TSPS serves to assist driving to smoothly cross intersections with traffic lights by using the traffic signal information on the traffic lights.

The communication device 25 may obtain the traffic signal information by, for example, communicating with an optical beacon provided on a side margin of the road or the like or performing vehicle-to-vehicle communication with another vehicle traveling around the host vehicle M.

<Vehicle Sensor 30>

The vehicle sensor 30 has a function of detecting various pieces of information on the host vehicle M. The vehicle sensor 30 includes: a vehicle speed sensor that detects the vehicle speed of the host vehicle M; an acceleration sensor that detects the acceleration of the host vehicle M; a yaw rate sensor that detects the angular speed of the host vehicle M about a vertical axis; an orientation sensor that detects the orientation of the host vehicle M; a tilt angle sensor that detects the tilt angle of the host vehicle M; an illuminance sensor that detects the illuminance of the area where the host vehicle M is present; a raindrop sensor that detects the amount of raindrops at the area where the host vehicle M is present; and so on.

<Configuration of HMI 35>

Figure 4:
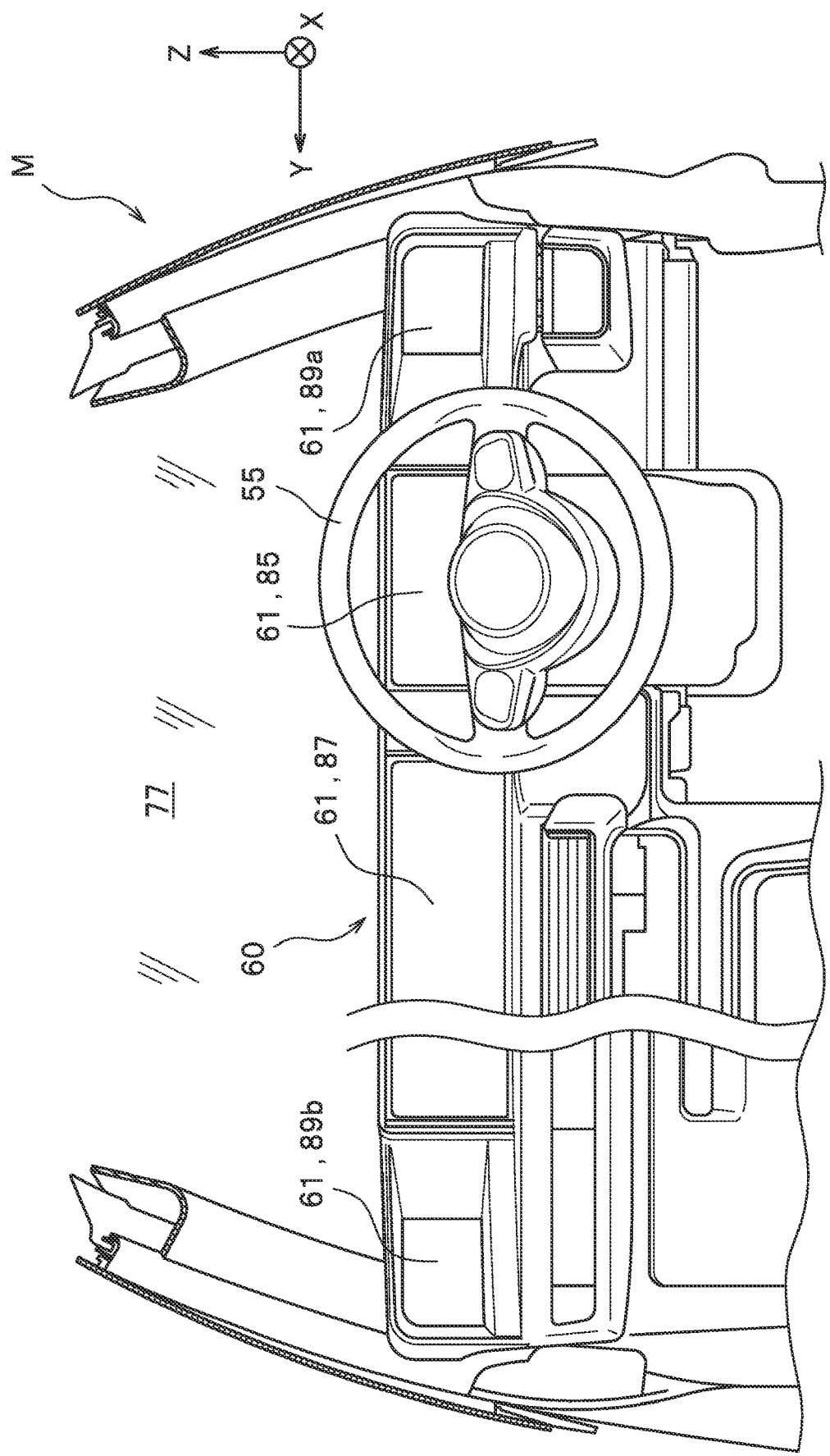
FIG. 4 is a diagram showing a front structure of a passenger compartment of an autonomous vehicle.

Next, the HMI 35 is described with reference to FIGS. 3 and 4.

FIG. 3 is a schematic configuration diagram of the HMI 35 connected to the vehicle control device 100 according to an embodiment of the present invention. FIG. 4 is a diagram illustrating a front structure of the cabin of the vehicle M including the vehicle control device 100.

As illustrated in FIG. 3, the HMI 35 includes constituent members of a driving operation system and constituent members of a non-driving operation system. There is no clear boundary between them, and a configuration in which constituent members of the driving operation system includes functions of the non-driving operation system (or vice versa) may be employed.

As illustrated in FIG. 3, the HMI 35 includes, as the constituent members of the driving operation system; an accelerator pedal 41, an accelerator position sensor 43, and an accelerator pedal counterforce output device 45; a brake pedal 47 and a brake depression amount sensor 49; a shift lever 51 and a shift position sensor 53; a steering wheel 55, a steering angle sensor 57 and a steering torque sensor 58; and other driving operation devices 59.

The accelerator pedal 41 is an acceleration operator that receives an acceleration instruction (or a deceleration instruction with a returning operation) by the driver. The accelerator position sensor 43 detects the amount of depression of the accelerator pedal 41 and outputs an accelerator position signal indicating the amount of the depression to the vehicle control device 100.

Note that a configuration may be employed which, instead of outputting the accelerator position signal to the vehicle control device 100, outputs the accelerator position signal directly to the travel drive force output device 200, the steering device 210, or the brake device 220. This applies also to the other components of the driving operation system to be described below. The accelerator pedal counterforce output device 45 outputs a force (operation counterforce) to the accelerator pedal 41 in the opposite direction from the direction in which the accelerator pedal 41 is operated, for example, in accordance with an instruction from the vehicle control device 100.

The brake pedal 47 is a deceleration operator that receives a deceleration instruction by the driver. The brake depression amount sensor 49 detects the amount of depression of (or the force of depression on) the brake pedal 47, and outputs a brake signal indicating the result of the detection to the vehicle control device 100.

The shift lever 51 is a gearshift operator that receives a shift stage change instruction by the driver. The shift position sensor 53 detects a shift stage designated by the driver and outputs a shift position signal indicating the result of the detection to the vehicle control device 100.

The steering wheel 55 is a steering operator that receives a turn instruction by the driver. The steering angle sensor 57 detects the steering angle of the steering wheel 55, and outputs a steering angle signal indicating the result of the detection to the vehicle control device 100. The steering torque sensor 58 detects torque applied to the steering wheel 55, and outputs a steering torque signal indicating the result of the detection to the vehicle control device 100.

The steering wheel 55 corresponds to a "driving operator" in the present invention.

The other driving operation devices 59 are, for example, a joystick, buttons, a rotary switch, a graphical user interface (GUI) switch, and so on. The other driving operation devices 59 receive an acceleration instruction, a deceleration instruction, a turn instruction, and so on and output them to the vehicle control device 100.

As illustrated in FIG. 3, the HMI 35 includes, as the constituent members of the non-driving operation system: the interior display device 61; the speakers 63; a contacting operation detection device 65 and a content playback device 67; various operation switches 69; seats 73 and a seat drive device 75; glass windows 77 and a window drive device 79; an in-cabin camera 81; and an exterior display device 83, for example.

The interior display device 61 is a display device preferably of a touchscreen type having a function of displaying various pieces of information to the occupants in the cabin. As illustrated in FIG. 4, the interior display device 61 includes, in an instrument panel 60: a meter panel 85 provided at a position directly opposite the driver's seat; a multi-information panel 87 horizontally elongated in the vehicle width direction (the Y-axis direction in FIG. 4) and provided so as to face the driver's seat and the passenger's seat; a right panel 89a provided on the driver's seat side in the vehicle width direction; and a left panel 89b provided on the passenger's seat side in the vehicle width direction. Note that the interior display device 61 may be provided additionally at such a position as to face the rear seats (the back side of the front seats).

The meter panel 85 displays, for example, a speedometer, a tachometer, an odometer, shift position information, on/off information on lights, and so on.

The multi-information panel 87 displays, for example: map information on the area around the host vehicle M; information on the current position of the host vehicle M on the map; traffic information (including traffic signal information) on the road which the host vehicle M is currently traveling or a route which the host vehicle M is traveling; traffic participant information on traffic participants (including pedestrians, bicycles, motorcycles, other vehicles, and so on) present around the host vehicle M; various pieces of information such as messages to be presented to the traffic participants; and so on.

The right panel 89a displays image information on a right rear side and a right lower side relative to the host vehicle M captured by the camera 11 provided on the right side of the host vehicle M.

The left panel 89b displays image information on a left rear side and a left lower side relative to the host vehicle M captured by the camera 11 provided on the left side of the host vehicle M.

The interior display device 61 is not particularly limited. For example, it is formed of liquid crystal displays (LCDs), organic electroluminescence (EL) displays, or the like. The interior display device 61 may be formed of head-up displays (HUDs) that project necessary images on the glass windows 77.

The speakers 63 have a function of outputting voice and sound. An appropriate number of speakers 63 are provided at appropriate positions inside the cabin such as in the instrument panel 60, the door panels, and the rear parcel shelf (none of which is illustrated), for example.

When the interior display device 61 is of a touchscreen type, the contacting operation detection device 65 has a function of detecting a touched position on any of the display screens of the interior display device 61 and outputting information on the detected touched position to the vehicle control device 100. The contacting operation detection device 65 is able to omit this function when the interior display device 61 is not of a touchscreen type.

The content playback device 67 includes, for example, a digital versatile disc (DVD) playback device, a compact disc (CD) playback device, a television receiver, a playback device for various guide images, and so on. Some or all of the interior display device 61, the speakers 63, the contacting operation detection device 65, and the content playback device 67 may be components also used by the navigation device 20.

The various operation switches 69 are arranged at appropriate positions inside the cabin. The various operation switches 69 include an autonomous driving ON/OFF switch 71 that issues an instruction to immediately start autonomous driving (or to start autonomous driving in the future) or to stop autonomous driving. The autonomous driving ON/OFF switch 71 may be a GUI switch or a mechanical switch. The various operation switches 69 may also include switches for driving the seat drive device 75 and the window drive device 79.

The seats 73 are seats for the occupants in the host vehicle M to sit on. The seat drive device 75 freely drives the reclining angles, front-rear positions, yaw angles, and the like of the seats 73. The glass windows 77 are provided to all doors, for example. The window drive device 79 drive the glass windows 77 so as to open or close them.

The in-cabin camera 81 is a digital camera utilizing a solid-state imaging element, such as a CCD or a CMOS. The in-cabin camera 81 is provided at such a position as to be capable of capturing an image of at least the head of the driver sitting on the driver's seat, such as in the rearview mirror, the steering boss (neither of which is illustrated), or the instrument panel 60. In an example, the in-cabin camera 81 repetitively captures an image of the inside of the cabin including the driver on a periodic basis, for example.

The exterior display device 83 has a function of displaying various pieces of information to traffic participants present around the host vehicle M (including pedestrians, bicycles, motorcycles, other vehicles, and so on). The exterior display device 83 includes, in a front grill of the host vehicle M, a right front light unit and a left front light unit (not shown) provided separated from each other in the vehicle width direction, and a front display unit (not shown) provided between the right and left front light units.

[Configuration of Vehicle Control Device 100]

Next, referring back to FIG. 2, a configuration of the vehicle control device 100 is described.

The vehicle control device 100 is implemented by, for example, at least one processor or hardware having an equivalent function. The vehicle control device 100 may be configured of a combination of electronic control units (ECUs), micro-processing units (MPUs), or the like in each of which a processor such as a central processing unit (CPU), a storage device, and a communication interface are connected by an internal bus.

The vehicle control device 100 includes the target lane determination unit 110, a driving assist control unit 120, a travel control unit 160, an HMI control unit 170, and a storage unit 180.

The functions of the target lane determination unit 110 and the driving assist control unit 120 and part or entirety of the function of the travel control unit 160 are implemented by the processor executing programs (software). Also, some or all of these functions may be implemented by hardware such as a large-scale integration (LSI) circuit or an application specific integrated circuit (ASIC) or be implemented by a combination of software and hardware.

In the following description, when a subject is mentioned like "~ unit does . . . ", the driving assist control unit 120 reads out the corresponding program from a read only memory (ROM) or an electrically erasable programmable read-only memory (EEPROM) as necessary, loads it into a random-access memory (RAM), and executes the corresponding function (described later).

The program may be pre-stored in the storage unit 180, or taken into the vehicle control device 100 from another storage medium or through a communication medium, as necessary.

<Target Lane Determination Unit 110>

The target lane determination unit 110 is implemented by a micro processing unit (MPU), for example. The target lane determination unit 110 divides a route provided from the navigation device 20 into a plurality of blocks (for example, divides the route at 100 [m]-intervals in the direction of advance of the vehicle), and determines a target lane in each block by referring to accurate map information 181. For example, the target lane determination unit 110 determines which lane from the left to travel. When a branching point, a merging point, or the like is present on the route, the target lane determination unit 110 determines the target lane such that the host vehicle M is able to travel a rational traveling route for advancing to the target branch path. The target lane determined by the target lane determination unit 110 is stored in the storage unit 180 as target lane information 182.

<Driving Assist Control Unit 120>

The driving assist control unit 120 includes a driving assist mode control unit 130, a recognition unit 140, and a switching control unit 150.

<Driving Assist Mode Control Unit 130>

The driving assist mode control unit 130 determines an autonomous driving mode (autonomous driving assisting state) to be executed by the driving assist control unit 120 based on an operation of the HMI 35 by the driver, an event determined by an action plan generation unit 144, how the host vehicle M should travel determined by a path generation unit 147, and so on. The HMI control unit 170 is notified of the autonomous driving mode.

Each autonomous driving mode is able to be switched (overridden) to a lower-level autonomous driving mode by an operation of a constituent element of the driving operation system in the HMI 35.

The override is initiated, for example, when a constituent element of the driving operation system in the HMI 35 by the driver of the host vehicle M continues to be operated for longer than a predetermined time, when a predetermined amount of change in operation (e.g., the accelerator position of the accelerator pedal 41, the brake depression amount of the brake pedal 47, or the steering angle of the steering wheel 55) is exceeded, when a constituent element of the driving operation system is operated more than a predetermined number of times, or the like.

<Recognition Unit 140>

The recognition unit 140 includes a host vehicle position recognition unit 141, an outside recognition unit 142, an area identification unit 143, the action plan generation unit 144, and the path generation unit 147.

<Host Vehicle Position Recognition Unit 141>

The host vehicle position recognition unit 141 recognizes the traveling lane which the host vehicle M is currently traveling and the position of the host vehicle M relative to the traveling lane, based on the accurate map information 181 stored in the storage unit 180 and information inputted from the cameras 11, the radars 13, the lidars 15, the navigation device 20, or the vehicle sensor 30.

The host vehicle position recognition unit 141 recognizes the traveling lane by comparing the pattern of road section lines recognized from the accurate map information 181 (e.g., the arrangement of continuous lines and broken lines) and the pattern of the road section lines around the host vehicle M recognized from images captured by the cameras 11. In this recognition, the current position of the host vehicle M obtained from the navigation device 20 and the result of processing by the INS may be considered.

<Outside Recognition Unit 142>

As illustrated in FIG. 2, the outside recognition unit 142 recognizes an outside situation including, for example, the positions, vehicle speeds, and accelerations of nearby vehicles based on the information on the outside inputted from the external sensor 10 including the cameras 11, the radars 13, and the lidars 15. The nearby vehicles refer to, for example, other vehicles traveling around the host vehicle M in the same direction as the host vehicle M (a leading vehicle and a trailing vehicle; details is described later).

The positions of the nearby vehicles may be represented as the centers of gravity of these other vehicles or representative points such as corners, or represented as areas expressed by the contours of the other vehicles. The states of the nearby vehicles may include the speeds and accelerations of the nearby vehicles and whether the nearby vehicles are changing lanes (or whether they are about to change lanes) which are figured out based on information from the above-mentioned various instruments. Alternatively, the outside recognition unit 142 may employ a configuration that recognizes the positions of targets including guard rails, utility poles, parked vehicles, pedestrians, and traffic signs, as well as the nearby vehicles including the leading vehicle and the trailing vehicle.

In embodiments of the present invention, of the nearby vehicles, the vehicle that is traveling immediately ahead of the host vehicle M in the same traveling lane as that of the host vehicle M and is a following target in following travel control is referred to as "leading vehicle". Also, of the nearby vehicles, the vehicle that is traveling immediately behind the host vehicle M in the same traveling lane as that of the host vehicle M is referred to as "trailing vehicle".

<Area Identification Unit 143>

The area identification unit 143 obtains information on specific areas present around the host vehicle M (interchanges: ICs, junctions: JCTs, and points where the number of lanes increases or decreases) based on map information. In this way, the area identification unit 143 is able to obtain information on specific areas that assist the host vehicle M to travel smoothly even if the host vehicle M is hidden behind vehicles ahead including the leading vehicle and is able to capture an image in the direction of advance with the external sensor 10.

Instead of obtaining the information on specific areas based on the map information, the area identification unit 143 may obtain the information on the specific areas by identifying targets with image processing based on an image in the direction of advance captured with the external sensor 10 or by recognizing targets based on the contours in an image in the direction of advance with internal processing by the outside recognition unit 142.

Also, a configuration may be employed which, as is described later, uses the VICS information obtained by the communication device 25 to enhance the accuracy of the information on the specific areas obtained by the area identification unit 143.

<Action Plan Generation Unit 144>

The action plan generation unit 144 sets the start point of autonomous driving and/or the destination point of the autonomous driving. The start point of the autonomous driving may be the current position of the host vehicle M or a geographical point at which an operation is performed as an instruction to perform the autonomous driving. The action plan generation unit 144 generates an action plan in the zone from this start point to the destination point of the autonomous driving. Note that the action plan is not limited to the above, and the action plan generation unit 144 may generate action plans for any zones.

The action plan is formed of a plurality of events to be executed in turn, for example. Examples of the plurality of events include: a deceleration event in which the host vehicle M is caused to decelerate; an acceleration event in which the host vehicle M is caused to accelerate; a lane keep event in which the host vehicle M is caused to travel so as not to depart from its traveling lane; a lane change event in which the host vehicle M is caused to change its traveling lane; a passing event in which the host vehicle M is caused to pass the leading vehicle; a branching event in which the host vehicle M is caused to change to the desired lane at a branching point or to travel so as not to depart from the current traveling lane; a merge event in which the host vehicle M is in a merging lane for merging into a main lane and is caused to accelerate or decelerate and change its traveling lane; a handover event in which the host vehicle M is caused to transition from the manual driving mode to an autonomous driving mode (autonomous driving assisting state) at the start point of the autonomous driving or transition from the autonomous driving mode to the manual driving mode at the scheduled end point of the autonomous driving; and so on.

The action plan generation unit 144 sets a lane change event, a branching event, or a merge event at each point where the target lane determined by the target lane determination unit 110 changes. Information indicating the action plan generated by the action plan generation unit 144 is stored in the storage unit 180 as action plan information 183.

The action plan generation unit 144 includes a mode changing unit 145 and a notification control unit 146.

<Mode Changing Unit 145>

Based, for example, on the result of recognition of the targets present in the direction of advance of the host vehicle M by the outside recognition unit 142, the mode changing unit 145 selects a driving mode suitable for the recognition result from among driving modes including a plurality of preset levels of autonomous driving modes and the manual driving mode, and causes the host vehicle M to perform autonomous driving using the selected driving mode.

<Notification Control Unit 146>

When the mode changing unit 145 changes the driving mode of the host vehicle M, the notification control unit 146 issues a notice indicating that the driving mode of the host vehicle M is changed. The notification control unit 146, for example, causes the speakers 63 to output audio information pre-stored in the storage unit 180 to issue a notice indicating that the driving mode of the host vehicle M is changed.

Note that the notice is not limited to an audio notice. The notice may be issued in the form of a display, emitted light, a vibration, or a combination of these as long as it is able to notify the driver of the change in the driving mode of the host vehicle M.

<Path Generation Unit 147>

The path generation unit 147 generates a path which the host vehicle M should travel, based on the action plan generated by the action plan generation unit 144.

<Switching Control Unit 150>

As illustrated in FIG. 2, the switching control unit 150 switches the driving mode between an autonomous driving mode and the manual driving mode based on a signal inputted from the autonomous driving ON/OFF switch 71 (see FIG. 3) and so on. Also, based on an operation of a constituent element of the driving operation system in the HMI 35 performed as an accelerating, decelerating, or steering instruction, the switching control unit 150 switches the current autonomous driving mode to a lower-level driving mode. For example, if a state where an operation amount indicated by a signal inputted from a constituent element of the driving operation system in the HMI 35 is above a threshold value continues for a reference time or longer, the switching control unit 150 switches (overrides) the current autonomous driving mode to a lower-level driving mode.

Also, the switching control unit 150 may perform switching control that brings the driving mode back to the original autonomous driving mode if detecting no operation on any constituent elements of the driving operation system in the HMI 35 for a predetermined time after the switching to the lower-level driving mode by the override.

<Travel Control Unit 160>

The travel control unit 160 controls travel of the host vehicle M by controlling the travel drive force output device 200, the steering device 210, and the brake device 220 such that the host vehicle M will pass through the path generated by the path generation unit 147, which the host vehicle M should travel, on the scheduled time.

<HMI Control Unit 170>

When notified of setting information on the autonomous driving mode of the host vehicle M by the driving assist control unit 120, the HMI control unit 170 refers to mode-by-mode operation permission information and controls the HMI 35 according to contents set for the autonomous driving mode.

As illustrated in FIG. 2, based on the information on the driving mode of the host vehicle M obtained from the driving assist control unit 120 and by referring to the mode-by-mode operation permission information, the HMI control unit 170 determines the devices permitted to be used (the navigation device 20 and part or entirety of the HMI 35) and the devices not permitted to be used. Also, based on the result of the above determination, the HMI control unit 170 controls whether to accept the driver's operations of the driving operation system in the HMI 35 and the navigation device 20.

For example, when the driving mode executed by the vehicle control device 100 is the manual driving mode, the HMI control unit 170 accepts the driver's operations of the driving operation system in the HMI 35 (e.g., the accelerator pedal 41, the brake pedal 47, the shift lever 51, the steering wheel 55, and so on; see FIG. 3).

<Display Control Unit 171>

The HMI control unit 170 includes a display control unit 171. The display control unit 171 controls displays on the interior display device 61 and the exterior display device 83. Specifically, for example, when the driving mode executed by the vehicle control device 100 is an autonomous driving mode with a high degree of autonomy, the display control unit 171 performs control that causes the interior display device 61 and/or the exterior display device 83 to display information such as a reminder, warning, or driving assistance to traffic participants present around the host vehicle M. is <Storage Unit 180>

The storage unit 180 stores pieces of information such as the accurate map information 181, the target lane information 182, the action plan information 183, and the mode-by-mode operation permission information 184, for example. The storage unit 180 is implemented with a ROM, a RAM, a hard disk drive (HDD), a flash memory, or the like. The programs to be executed by the processor may be pre-stored in the storage unit 180 or downloaded from an external device via in-vehicle Internet equipment or the like. Alternatively, the programs may be installed into the storage unit 180 by connecting a mobile storage medium storing the programs to a drive device not illustrated.

The accurate map information 181 is map information that is more accurate than the normal map information included in the navigation device 20. The accurate map information 181 contains, for example, information on the centers of lanes, information on the boundaries of the lanes, and so on. The boundaries of the lanes include the types, colors, and lengths of lane marks, the widths of roads, the widths of shoulders, the widths of main lanes, the widths of lanes, the positions of boundaries, the types of boundaries (guard rail, plant, and curb), hatched zones, and so on, and these boundaries are contained in an accurate map.

The accurate map information 181 may also contain road information, traffic regulation information, address information (addresses and postal codes), facility information, telephone number information, and so on. The road information contains information indicating the types of roads such as expressways, tollways, national highways, and prefectural roads, and information on the number of lanes in each road, the width of each lane, the gradient of the road, the position of the road (three-dimensional coordinates including the longitude, latitude, and height), the curvature of the lane, the positions of merging or branching points on the lane, the signs provided on the road, and so on. The traffic regulation information contains information such as the occurrence of lane closures due to construction, traffic accident, congestion, or the like.

[Travel Drive Force Output Device 200, Steering Device 210, and Brake Device 220]

As illustrated in FIG. 2, the vehicle control device 100 controls the drive of the travel drive force output device 200, the steering device 210, and the brake device 220 in accordance with a travel control instruction from the travel control unit 160.

<Travel Drive Force Output Device 200>

The travel drive force output device 200 outputs drive force (torque) for causing the host vehicle M to travel to its drive wheels. When the host vehicle M is an automobile with an internal combustion engine as a power source, the travel drive force output device 200 includes, for example, the internal combustion engine, a transmission, and an engine electronic control unit (ECU) that controls the internal combustion engine (none of which is illustrated).

Alternatively, when the host vehicle M is an electric automobile with an electric motor as a power source, the travel drive force output device 200 includes a motor for traveling and a motor ECU that controls the motor for traveling (neither of which is illustrated).

Still alternatively, when the host vehicle M is a hybrid automobile, the travel drive force output device 200 includes an internal combustion engine, a transmission, an engine ECU, a motor for traveling, and a motor ECU (none of which is illustrated).

When the travel drive force output device 200 includes only an internal combustion engine, the engine ECU adjusts the throttle opening degree of the internal combustion engine, the shift stage, and so on in accordance with later-described information inputted from the travel control unit 160.

When the travel drive force output device 200 includes only a motor for traveling, the motor ECU adjusts the duty ratio of a PWM signal to be applied to the motor for traveling in accordance with information inputted from the travel control unit 160.

When the travel drive force output device 200 includes an internal combustion engine and a motor for traveling, the engine ECU and the motor ECU cooperate with each other to control the travel drive force in accordance with information inputted from the travel control unit 160.

<Steering Device 210>

The steering device 210 includes, for example, a steering ECU and an electric motor (neither of which is illustrated). The electric motor changes the direction of the turning wheels by exerting force on a rack-and-pinion mechanism, for example. The steering ECU drives the electric motor in accordance with information inputted from the vehicle control device 100 or steering angle or steering torque information inputted, to thereby change the direction of the turning wheels.

<Brake Device 220>

The brake device 220 is, for example, an electric servo brake device including a brake caliper, a cylinder that transfers hydraulic pressure to the brake caliper, an electric motor that generates the hydraulic pressure in the cylinder, and a braking control unit (none of which is illustrated). The braking control unit of the electric servo brake device controls the electric motor in accordance with information inputted from the travel control unit 160 to output a brake torque corresponding to a braking operation to each wheel. The electric servo brake device may include a mechanism, as a backup, that transfers hydraulic pressure generated by operating the brake pedal 47 to the cylinder through a master cylinder.

Note that the brake device 220 is not limited to the above-described electric servo brake device, and may be an electronically controlled hydraulic brake device. The electronically controlled hydraulic brake device controls an actuator in accordance with information inputted from the travel control unit 160 to transfer hydraulic pressure in a master cylinder to a cylinder. Also, the brake device 220 may include a regenerative brake using a motor for traveling that is able to be included in the travel drive force output device 200.

[Block Configuration of Vehicle Control Device 300]

Next, description is given of a block configuration of the vehicle control device 300 according to the embodiment of the present invention provided in the vehicle control device 100 described above with reference to FIG. 5.

Figure 5:
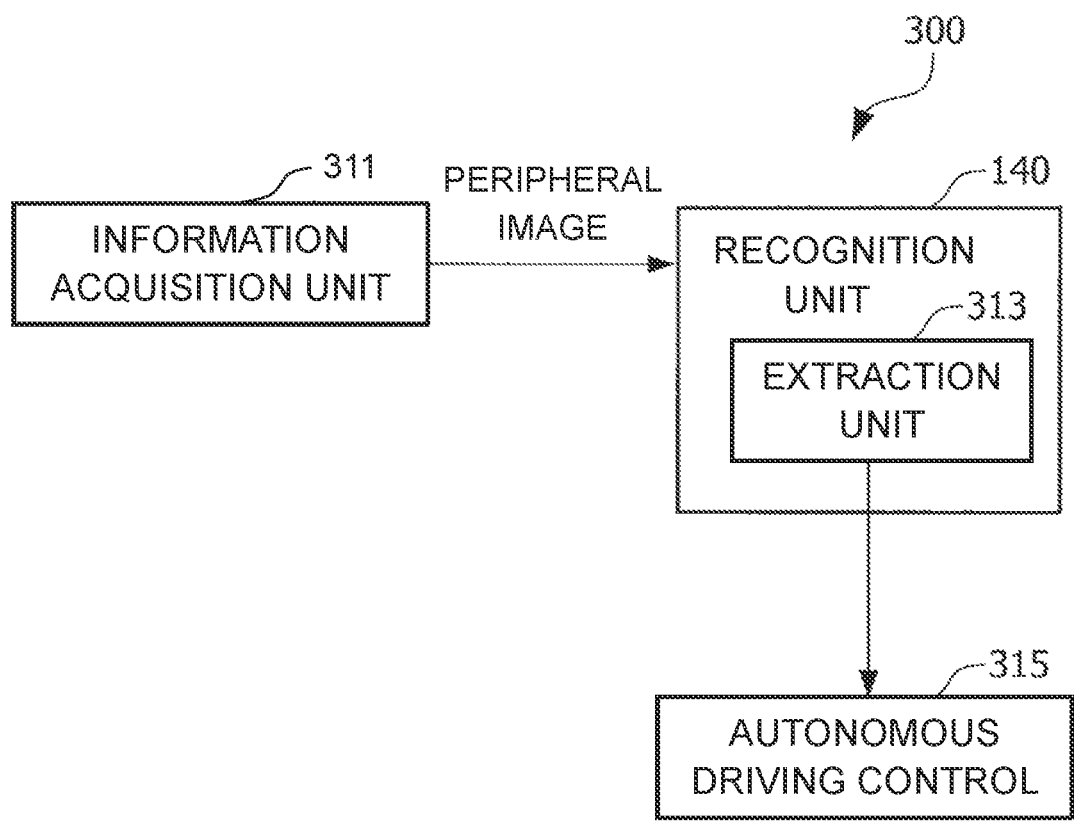
FIG. 5 is a block configuration diagram conceptually illustrating an execution unit of function limitation based on an extraction result of a defective image held by a vehicle control device.

FIG. 5 is a block configuration diagram conceptually illustrating an execution unit of function limitation based on the extraction result of a defective image possessed by the vehicle control device 300 according to the embodiment of the present invention.

As shown in FIG. 5, the vehicle control device 300 according to the embodiment of the present invention includes an information acquisition unit 311, a recognition unit 140 including an extraction unit 313, and an autonomous driving control unit 315.

<Information Acquisition Unit 311>

As shown in FIG. 5, the information acquisition unit 311 has a function of acquiring the outside information related to the frontward image including the traveling road surface of the host vehicle M captured by the camera 11 among the external sensors 10. The information acquisition unit 311 is a functional unit included in the recognition unit 140 of the vehicle control device 100 shown in FIG. 2.

<Recognition Unit 140>

The recognition unit 140 recognizes the traveling environment in front of the host vehicle M based on the frontward image including the traveling road surface of the host vehicle M captured by the camera 11 and acquired by the information acquisition unit 311.

<Extraction Unit 313>

The extraction unit 313 included in the recognition unit 140 extracts a defective image from the frontward image of the host vehicle M. When extracting the defective image from the frontward image, the extraction unit 313 selects and extracts a sub-region related to the defective image from a plurality of sub-regions FI01 to FI12 (see FIG. 7B) obtained by dividing the region of field angle 317 related to the frontward image.

In particular, when the extraction unit 313 extracts a sub-region related to a defective image from the plurality of sub-regions FI01 to FI12, the extraction unit 313 regards as a defective image a candidate image to be extracted whose difference in brightness or luminance with respect to a peripheral image is less than a predetermined threshold to extract the sub-region related to the defective image from the plurality of sub-regions FI01 to FI12.

<Autonomous Driving Control Unit 315>

The autonomous driving control unit 315 controls autonomous driving including at least one of speed control and steering control of the host vehicle M on a basis of the traveling environment of the host vehicle M recognized by the recognition unit 140. Here, "autonomous driving" is a concept that includes both a driving support function and an autonomous driving function.

More specifically, when the extraction unit 313 extracts a defective image, the autonomous driving control unit 315 limits a function assigned to the sub-region related to the defective image among the plurality of functions involved in the autonomous driving.

Specifically, when the sub-region related to the defective image is extracted by the extraction unit 313, the autonomous driving control unit 315 limits one or more functions assigned to the sub-region related to the defective image, but permits one or more functions assigned to sub-regions related to a good image that does not include the sub-region related to the defective image among the region of field angle 317 related to the frontward image limiting.

Next, the autonomous driving control unit 315 executes a control of autonomous driving by appropriately using applicable functions among the plurality of functions involved in the autonomous driving at an appropriate time.

The function of limiting any of the plurality of functions involved in the autonomous driving controlled by the autonomous driving control unit 315 is described in detail below.

[Operation of Vehicle Control Device 300]

Next, the operation of the vehicle control device 300 according to the embodiment of the present invention is described with reference to FIG. 6, which is a flowchart for explaining the operation of the vehicle control device 300.

It is premised that the autonomous driving vehicle (host vehicle) M equipped with the vehicle control device 300 is travelling at a certain preset autonomous driving level (any one of the autonomous driving levels 1 to 5 according to the definition of the SAE International document J3016). It is assumed that you are).

In step S11 shown in FIG. 6, the information acquisition unit 311 shown in FIG. 5 acquires information on the frontward image including the traveling road surface of the host vehicle M captured by the camera 11 of the external sensors 10.

In step S12, the recognition unit 140 shown in FIG. 5 recognizes the traveling environment in front of the host vehicle M based on the frontward image acquired in step S11.

In step S13, the extraction unit 313 included in the recognition unit 140 extracts a sub-region related to a defective image from the plurality of sub-regions FI01 to FI12 (see FIG. 7B) obtained by dividing the region of field angle 317 related to the frontward image of the host vehicle M.

In step S14, the recognition unit 140 determines whether or not any sub-region related to a defective image is extracted. As a result of the determination in step S14, when it is determined that the sub-region related to the defective image is extracted (Yes in step S14), the recognition unit 140 advances the processing flow to the next step S15.

On the other hand, as a result of the determination in step S14, when it is determined that the sub-region related to the defective image is not extracted (No in step S14), the recognition unit 140 jumps the processing flow to step S16.

In step S15, when step S14 determines that the sub-region related to the defective image is extracted, the autonomous driving control unit 315 limits functions assigned to the sub-region related to the defective image among the plurality of functions involved in the autonomous driving.

In step S16, the autonomous driving control unit 315 executes the control of the autonomous driving by using the applicable function among the plurality of functions involved in the autonomous driving.

[Operation of Vehicle Control Device 300 According to Embodiment of Present Invention]

Next, the operation of the vehicle control device 300 according to the embodiment of the present invention is described in more detail with reference to FIGS. 7A and 7B.

Figure 7A:
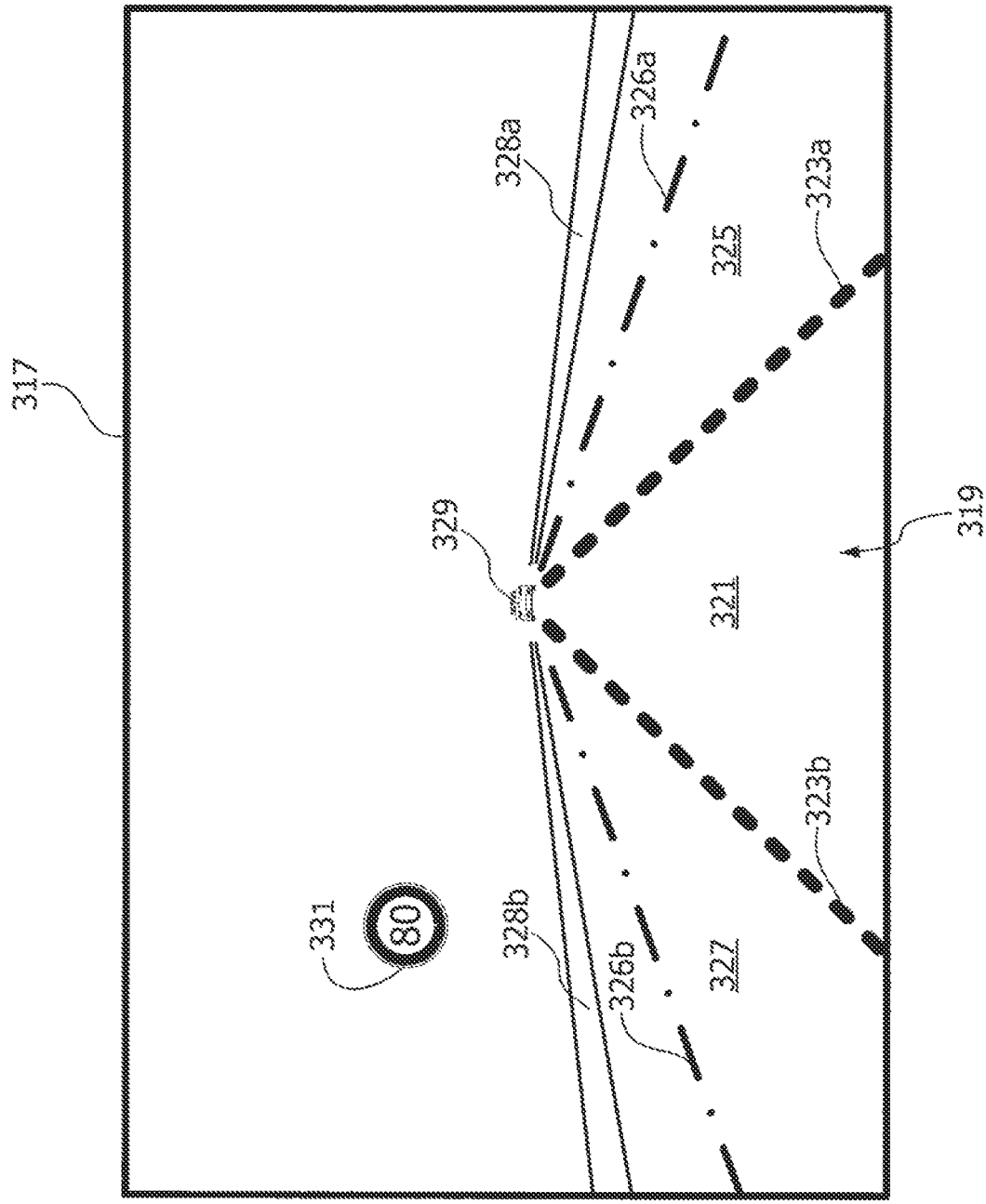
FIG. 7A is a diagram conceptually illustrating a region of field angle related to a frontward image of the host vehicle captured by a camera.

FIG. 7A is a diagram conceptually illustrating the region of field angle 317 related to the frontward image of the host vehicle M captured by the camera 11. FIG. 7B is a diagram showing a state in which any one of a plurality of functions involved in the autonomous driving is appropriately assigned to each of the plurality of sub-regions into which the region of field angle related to the frontward image of the host vehicle M is divided.

FIG. 7A conceptually represents the region of field angle 317 related to the frontward image of the host vehicle M while the host vehicle M is traveling on a central lane 321 of the three-lane highway 319. The central lane 321 is defined by right and left lane boundary lines 323b and 323a. The right lane 325 is defined by the right lane boundary line 323a and the right-lane outer line 326a. The left lane 327 is defined by a left lane boundary line 323b and a left-lane outer line 326b. Right and left guardrails 328a and 328b are provided along the three-lane highway 319 outside of the right-lane outer line 326a and the left-lane outer line 326b (at an end of FIG. 7A in a horizontal direction when the region of field angle 317 is viewed straight).

In the region of field angle 317 related to the frontward image of the host vehicle M, a preceding vehicle 329 is visible in front of the host vehicle M traveling in the central lane 321. In addition, there is a traffic sign 331 relating to a speed limit that is visible at the left in a direction facing to the traveling direction of the vehicle M.

Figure 7B:
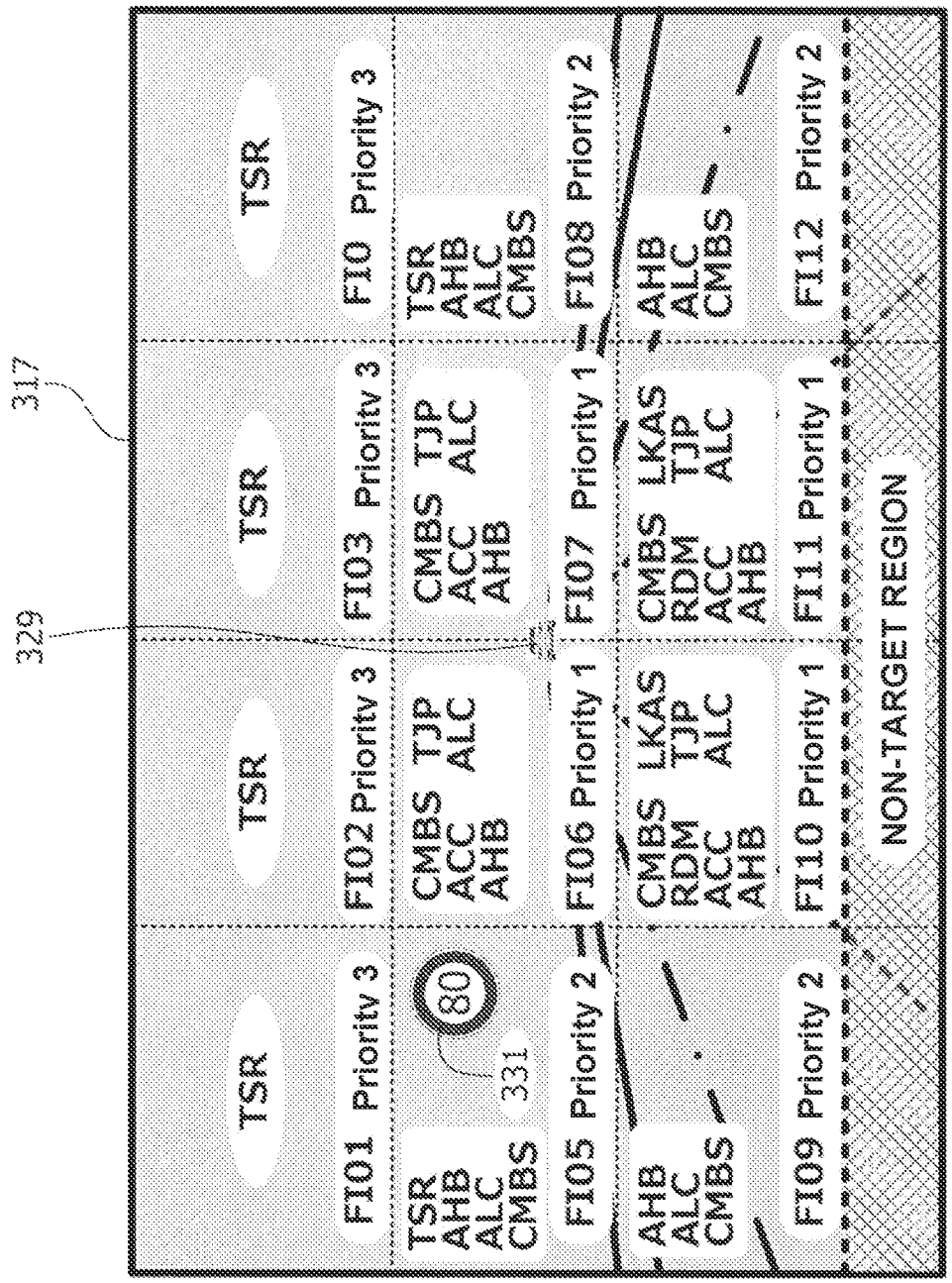
FIG. 7B is a diagram showing a state in which the region of field angle related to the frontward image of the host vehicle is divided into a plurality of sub-regions and each of the plurality of sub-regions are appropriately assigned to any one of a plurality of functions involved in the autonomous driving.

FIG. 7B conceptually represents the state in which any one of the plurality of functions involved in the autonomous driving is appropriately assigned to each of the plurality of the divided regions FI01 to FI12 in the region of field angle 317 related to the frontward image of the host vehicle M shown in FIG. 7A. In addition, regions that are included in shaded portion positioned at the below part of the region of field angle 317 in FIG. 7B, are non-target regions excluded from the extraction target to be extracted as the defective image.

Table 1 shows examples of a plurality of functions involved in the autonomous driving.

TABLE 1

| Name | Priority | Function | Recognition target to be considered for operation |
|---|---|---|---|
| CMBS | 1, 2 | Collision Mitigation Braking System | Preceding vehicle, person in front |
| RDM | 1 | Road Departure Mitigation System | White line |
| ACC | 1 | Adaptive Cruise Control | Preceding vehicle |
| AHB | 1, 2 | Automatic High Beam | Preceding vehicle, ongoing vehicle |
| LKAS | 1 | Lane Keeping Assist System | White line |
| TJP | 1 | Traffic Jam Pilot | Preceding vehicle, person in front, white line |
| ALC | 1, 2 | Automatic Lane Change | Vehicle on adjacent lane, white line |
| TSR | 2, 3 | Traffic Sign Recognition | Traffic sign |

As shown in Table 1, the functions involved in the autonomous driving include CMBS (Collision Mitigation Braking System), RDM (Road Departure Mitigation), ACC (Adaptive Cruise Control), AHB (Automatic High Beam), LKAS (Lane Keeping Assist System), TJP (Traffic Jam Pilot), ALC (Automatic Lane Change), and TSR (Traffic Sign Recognition) for exemplification. These functions are outlined n an example assuming that the host vehicle M is traveling in the central lane 321 of the three-lane highway 319.

CMBS (Collision Mitigation Brake System) is a function that prompts a driver to perform an operation to avoid a rear-end collision by warning the driver it when the vehicle control device 100 installed on the host vehicle M determines that there is a risk of the rear-end collision and on the other hand tries to reduce collision damage by activating the automatic braking when it is determined that the rear-end collision is not able to be avoided.

RDM (Road Departure Mitigation system) is a function that prompts a driver to perform an operation to avoid a lane departure by warning the driver it when the vehicle control device 100 installed on the host vehicle M determines that there is a risk of the lane departure from the central lane 321 and on the other hand tries to mitigate an extent of the lane departure by activating the automatic steering and the automatic braking when it is determined that the lane departure is not able to be avoided.

ACC (Adaptive Cruise Control) is a function that tries to reduce a driving burden of the driver by keeping a vehicle speed of the host vehicle M at a preset vehicle speed and operating automatic acceleration/deceleration so as to maintain an inter-vehicle distance from the preceding vehicle 329.

AHB (Automatic High Beam) is a function that supports securing of good visibility and reduces a frequency of manual switching operations by automatically switching a beam between a high beam and a low beam based on a tail lamp of the preceding vehicle 329 in front of the host vehicle M, a headlight of the oncoming vehicle, a street light, and the like.

LKAS (lane keeping support) is a function that detects the right and left lane boundary lines 323b and 323a that define the central lane 321 using the external sensor 10 (camera 11) to support lane keeping by activating the automatic steering so that the host vehicle M maintains to travel on the vicinity of the center of the central lane 321.

TJP (Traffic Jam Pilot) a limited autonomous driving function that is able to inter-vehicle distance from the preceding vehicle 329 so as to maintain an inter-vehicle distance from the preceding vehicle 329 while following changes in the vehicle speed of the preceding vehicle 329 and to cause the host vehicle M to travel while maintaining its position on the vicinity of the center of the central lane 321 when, for example, the host vehicle M is travelling at a low speed on a highway.

ALC (Automatic Lane Change) is a function to reduce the driving burden of the driver by acquiring information about a reduction in the number of lanes and a lane branch from map information and collating the driving lane (central lane 321 in this example) of host vehicle M with the map information to determine a necessity of lane change and activating a lane change when the lane change is required.

TSR (Traffic Sign Recognition support) is a function to call attention to the driver by detecting and recognizing a traffic sign placed along the three-lane highway 319 with the external sensor 10 (camera 11) and displaying the recognized traffic sign on a multi-information panel 87.

As shown in FIG. 7B, any one of the plurality of functions involved in autonomous driving is appropriately assigned to each of the plurality of sub-regions FI01 to FI12 belonging to the region of field angle 317 related to the frontward image of the host vehicle M.

As shown in Table 1 and FIG. 7B, the plurality of sub-regions FI01 to FI12 belonging to the region of field angle 317 are divided into three groups from a viewpoint of priority related to the autonomous driving. Sub-regions FI06, FI07, FI10, and FI11 with priority 1 belongs to the first group; sub-regions FI05, FI08, FI09, and FI12 with priority 2 belongs to the second group; and sub-regions FI01 to FI04 with priority 3 belongs to the third group. Functions mainly related to a behavior of the preceding vehicle 329 are assigned to the first group. Functions mainly related to a steering control in the lateral direction of the vehicle M are assigned to the second group.

More specifically, the priority 1 regions FI06, FI07, FI10, and FI11 belonging to the first group, as shown in Table 1 and FIG. 7B, are assigned with CMBS, RDM, ACC, AHB, LKAS, TJP, and ALC among the plurality of functions involved in the autonomous driving.

As shown in Table 1 and FIG. 7B, CMBS, AHB, ALC, and TSR among the plurality of functions involved in autonomous driving are assigned to the priority 2 regions FI05, FI08, FI09, and FI12 belonging to the second group.

As shown in Table 1 and FIG. 7B, TSR among the plurality of functions involved in the autonomous driving is assigned to the priority 3 regions FI01 to FI04 belonging to the third group.

Now, it is assumed that the extraction process is performed to extract the image related to the left-lane boundary line 323b as a defective image for the sub-region FI10 with priority 1 belonging to the first group, which causes a result that this sub-region FI10 with priority 1 is extracted as a sub-region related to the defective image. In this case, the autonomous driving control unit 315 limits the functions (CMBS, RDM, ACC, AHB, LKAS, TJP, and ALC) assigned to the sub-region FI10 related to the defective image among the plurality of functions involved in the autonomous driving.

However, the function (TSR) assigned to the regions related to good images excluding the sub-region FI10 related to the defective image among the plurality of sub-regions FI01 to FI12 belonging to the region of field angle 317 is permitted.

In another case, it is assumed that the extraction process is performed to extract the image related to the traffic sign as a defective image for the FI05 of priority 2 belonging to the second group, which causes a result that this sub-region FI05 with priority 2 is extracted as a sub-region related to the defective image. In this case, the autonomous driving control unit 315 limits the functions (CMBS, AHB, ALC, and TSR) assigned to the sub-region FI05 related to the defective image among the plurality of functions involved in the autonomous driving.

However, the function (RDM, ACC, LKAS, and TJP) assigned to the regions related to good images excluding the sub-region FI05 related to the defective image among the plurality of sub-regions FI01 to FI12 belonging to the region of field angle 317 is permitted.

In still another case, it is assumed that the extraction process is performed to extract the image related to the traffic sign as a defective image for the FI01 of priority 3 belonging to the third group, which causes a result that this sub-region FI01 with priority 3 is extracted as a sub-region related to the defective image. In this case, the autonomous driving control unit 315 limits the functions (TSR) assigned to the sub-region FI01 related to the defective image among the plurality of functions involved in the autonomous driving.

However, the function (CMBS, RDM, ACC, AHB, LKAS, TJP, and ALC) assigned to the regions related to good images excluding the sub-region FI01 related to the defective image among the plurality of sub-regions FI01 to FI12 belonging to the region of field angle 317 is permitted.

[Effect of Vehicle Control Device 300 According to Embodiment of Invention]

Next, description is given of an effect of the vehicle control device 300 according to the embodiment of the present invention.

A vehicle control device 300 according to the first aspect is premised to be the vehicle control device 300 that includes, as shown in FIG. 5, the information acquisition unit 311 that acquires information on the frontward image including the traveling road surface of the host vehicle M, the recognition unit 140 that recognizes the traveling environment of the host vehicle M based on the frontward image acquired by the information acquisition unit 311, and the autonomous driving control unit 315 performing control of the autonomous driving including at least one of the speed control and the steering control of the host vehicle M based on the traveling environment recognized by the recognition unit.

The recognition unit 140 includes the extraction unit 313 that extracts a defective image in the frontward image. The autonomous driving control unit 315 is adapted to have a configuration that limits functions related to the defective image among the plurality of functions involved in the autonomous driving when a defective image is extracted by the extraction unit 313.

In the vehicle control device 300 according to the first aspect, the extraction unit 313 included in the recognition unit 140 extracts a defective image from the frontward image.

There are assumed to be three major factors causing a defective image in the frontward images.

The first factor is that the extraction target itself such as a white line drawn on a road is deteriorated to be difficult to view.

The second factor is based on climate (rain, fog, haze, etc.) related to a traveling environment of the vehicle M.

The third factor is based on cloudiness and dirt generated in an optical system of the camera 11 of the external sensor 10 (including a windshield in a middle of an image capture path of the camera 11 when the camera 11 is placed in a vehicle compartment).

In the vehicle control device 300 according to the present invention, a factor that causes a defective image in the frontward images is assumed to be mainly the third factor based on the cloudiness and dirt generated in the optical system of the camera 11, but is not particularly limited thereto.

When a defective image is extracted by the extraction unit 313, that is, when the recognition capability of the traveling environment is degraded, the autonomous driving control unit 315 limits one or more functions related to the defective image among the plurality of functions involved in the autonomous driving.

The above-described plurality of functions involved in the autonomous driving means a concept that comprehensively includes both of driving support functions corresponding to the autonomous driving levels 1 and 2 according to the definition of SAE International document J3016 and autonomous driving functions corresponding to the autonomous driving levels 3 to 5 according to the definition of SAE International document J3016.

In the case of embodiments based on such a concept, the autonomous driving control unit 315 permits the functions related to good images not related to the defective image without limitation even if the defective image is extracted by the extraction unit 313.

According to the vehicle control device 300 of the first aspect, because the autonomous driving control unit 315 permits the functions related to the good images not related to the defective images without limitation even when the defective images are extracted by the extraction unit 313, the functions related to the autonomous driving is able to be continued to be performed as much as possible even if the recognition ability of the traveling environment based on the frontward image of the host vehicle M deteriorates.

The vehicle control device 300 according to the second aspect is the vehicle control device 300 according to the first aspect, wherein the region of field angle 317 related to the frontward image of the host vehicle M is divided into a plurality of sub-regions FI01 to FI12, to each of which one or more of the plurality of functions involved in the autonomous driving are assigned.

The extraction unit 313 of the recognition unit 140, when extracting the defective image from the frontward images, extracts a sub-region related to the defective image from the plurality of sub-regions FI01 to FI12.

When the sub-regions related to the defective image are extracted by the extraction unit 313, the autonomous driving control unit 315 is configured to limit one or more functions assigned to the sub-regions related to the defective image, but to permit one or more functions assigned to the sub-regions related to the good images that do not include the sub-region related to the defective image of the region of field angle 317 related to the frontward image.

According to the vehicle control device 300 of the second aspect, when the sub-region related to the defective image is extracted by the extraction unit 313, the autonomous driving control unit 315 limits one or more functions assigned to the sub-region related to the defective image, and on the other hand permits one or more functions assigned to the sub-regions related to the good images that does not include the sub-region related to the defective image of the region of field angle 317 related to the frontward image Therefore, compared with the vehicle control device 300 according to the first aspect, the vehicle control device 300 according to the second aspect is able to improve the effect of continuing the functions involved in the autonomous driving as much as possible, because the vehicle control device 300 according to the second aspect clearly determines whether or not the function can be limited based on whether or not the sub-region related to the defective image is extracted from the plurality of sub-regions FI01 to FI12 belonging to the region of field angle 317 related to the frontward image.

The vehicle control device 300 according to the third aspect is the vehicle control device 300 according to the second aspect, wherein the extraction unit 313 included in the recognition unit 140 is configured, when extracting the sub-region related to the defective image from the plurality of sub-regions FI01 to FI12, to regard as a defective image a candidate image to be extracted whose difference in brightness or luminance with respect to a peripheral image is less than a predetermined threshold and to extract the sub-region related to the defective image from the plurality of sub-regions FI01 to FI12.

In the vehicle control device 300 according to the third aspect, when extracting the sub-region related to the defective image from the plurality of sub-regions FI01 to FI12, the extraction unit 313 included in the recognition unit 140, regards as a defective image a candidate image to be extracted whose difference in brightness or luminance with respect to a peripheral image is less than a predetermined threshold and extracts the sub-region related to the defective image from the plurality of sub-regions FI01 to FI12.

Here, that the difference in brightness or luminance of a candidate image to be extracted with respect to the peripheral image is less than the predetermined threshold means that the brightness or luminance of the candidate image to be extracted is inconspicuous as compared with the brightness or luminance of the peripheral image. In such a case, it is rational to regard the candidate image to be extracted as the defective image.

It should be noted that the third aspect of the invention may be configured so that the predetermined threshold value regarding the difference in the brightness or luminance (blurring degree) of the candidate image to be extracted with respect to the peripheral image may be varied for each of the plurality of the sub-regions FI01 to FI12.

Further, the predetermined threshold value regarding the difference in brightness or luminance of the candidate image to be extracted with respect to the peripheral image may be varied depending on a type of the function involved in the autonomous driving in the same sub-region.

Specifically, for example, when comparing TSR (Traffic Sign Recognition) and CMBS (Collision Mitigation Braking System)/ACC (Adaptive Cruise Control) among the plurality of functions involved in the autonomous driving, TSR is low in terms of priority with respect to CMBS/ACC. Therefore, for TSR, its predetermined threshold value is set lower (i.e., its assigned sub-region is difficult to determine as the sub-region related to the defective image), while for CMBS/ACC, their predetermined threshold values are set higher (i.e., their assigned sub-regions are easily determined as the sub-region related to the defective image).

According to the vehicle control device 300 according to the third aspect, because the extraction unit 313 included in the recognition unit 140 regards as a defective image a candidate image to be extracted whose difference in brightness or luminance with respect to the peripheral image is less than the predetermined threshold and extracts the sub-region related to the defective image from the plurality of sub-regions FI01 to FI12, the sub-region related to the defective image is able to be accurately extracted from the plurality of sub-regions FI01 to FI12 compared with the vehicle control device 300 of the second aspect, when extracting the sub-region related to the defective image from the plurality of sub-regions FI01 to FI12.

As a result, it is possible to more accurately determine whether or not the plurality of functions involved in autonomous driving should be limited, so that the effect of appropriately controlling autonomous driving may be expected.

Furthermore, the vehicle control device 300 according to the fourth aspect is the vehicle control device 300 according to the second or third aspect, wherein the autonomous driving control unit 315 may be configured to stop the ALC function of changing a lane of the host vehicle M from a current traveling lane to an adjacent lane when the sub-region related to the defective image extracted by the extraction unit 313 is positioned on the end in the horizontal direction of the region of field angle 317 related to the frontward image (see the regions of priority-2 FI05, FI08, FI09, and FI12 belonging to the second group shown in FIG. 7B).

According to the vehicle control device 300 according to the fourth aspect, because the autonomous driving control unit 315 stops the ALC function of changing a lane of the host vehicle M from a current traveling lane to an adjacent lane, when the sub-region related to the defective image extracted by the extraction unit 313 is positioned on the end in the horizontal direction of the region of field angle 317 related to the frontward image, a requirement for stopping the automatic lane change (ALC) function is able to be clarified so that a determination is able to be appropriately performed on whether or not the plurality of functions involved in the autonomous driving should be limited.

As a result, the effect of accurately controlling the autonomous driving may be expected.

Furthermore, the vehicle control device 300 according to the fifth aspect is a vehicle control device 300 according to the second or third aspect, wherein the autonomous driving control unit 315, when a sub-region related to a defective image extracted by the extraction unit 313 is positioned on an upper portion in a vertical direction of the region of field angle 317 related to the frontward image (see the regions FI01 to FI04 of priority 3 belonging to the third group shown in FIG. 7B), is configured to stop the TSR function of recognizing the traffic sign 331 related to the front of the host vehicle M.

According to the vehicle control device 300 according to the fifth aspect, because the autonomous driving control unit 315 stops the TSR function of recognizing the traffic sign 331 related to the front of the host vehicle M when the sub-region related to the defective image extracted by the extraction unit 313 is positioned on an upper portion in a vertical direction of the region of field angle 317 related to the frontward image (see the regions FI01 to FI04 of priority 3 belonging to the third group shown in FIG. 7B), the autonomous driving control unit 315 is able to clarify requirements for stopping the TSR function to accurately determine whether or not the plurality of functions involved in the autonomous driving should be limited.

As a result, the effect of accurately controlling the autonomous driving may be expected.

Other Embodiments

The plurality of embodiments described above represent examples of embodying the present invention. Therefore, the technical scope of the present invention shall not be interpreted in a limited manner by these embodiments. This is because the present invention is able to be implemented in various ways without departing from its gist or its main characteristic features.

For example, in the description of the vehicle control device 300 according to the embodiment of the present invention, the region of field angle 317 related to the frontward image of the host vehicle M is described by exemplifying the by 12 regions FI01 to FI12 into which the region of field angle 317 is divided, the present invention Is not limited to this example.

The form and the number of sub-regions divided from the region of field angle 317 related to the frontward image of the host vehicle M may be appropriately configured so as to be changeable through an experiment, a simulation, and the like.

The present invention may be implemented by an embodiment in which a program that achieves one or more functions according to the above-described embodiments is supplied to a system or a device via a network or a storage medium, and read to be executed by one or more processors in a computer of the system or device. Alternatively, the present invention may be implemented by a hardware circuit (for example, ASIC) that achieves one or more functions. Information including a program that achieves each function may be stored in a recording device such as a memory or a hard disk, or a recording medium such as a memory card or an optical disk.

REFERENCE SIGNS LIST

140: Recognition unit
300: Vehicle control device
311: Information acquisition unit
313: Extraction unit
315: Autonomous driving control unit
317: Region of filed angle related to frontward image of host vehicle
M: Host vehicle (autonomous driving vehicle)

What is claimed is:

1. A vehicle control device comprising:
an information acquisition circuit configured to acquire information on a frontward image including a traveling road surface of a host vehicle,
a recognition circuit configured to recognize a traveling environment of the host vehicle based on the frontward image acquired by the information acquisition circuit, and
an autonomous driving control circuit configured to control autonomous driving including at least one of a speed control and a steering control of the host vehicle based on the traveling environment recognized by the recognition circuit,
wherein
the recognition circuit includes an extraction circuit configured to extract a defective image among the frontward images,
the autonomous driving control circuit is configured to have a main function of limiting a function related to the defective image among a plurality of functions involved in the autonomous driving if the recognition circuit extracts the defective image,
a region of field angle related to the frontward image of the host vehicle is divided into a plurality of sub-regions, to each of which one or more of the plurality of functions involved in the autonomous driving are assigned,
the extraction circuit of the recognition circuit is configured to extract a sub-region related to the defective image from the plurality of sub-regions when extracting the defective image from the frontward images,
the autonomous driving control circuit is configured to limit one or more functions assigned to the sub-regions related to the defective image, but to permit one or more functions assigned to the sub-regions related to non-defective images that do not include the sub-region related to the defective image of the region of field angle related to the frontward image, if the sub-regions related to the defective image are extracted by the extraction circuit,
the autonomous driving control circuit is configured to stop a function of changing a lane of the host vehicle from a current traveling lane to an adjacent lane if the sub-region related to the defective image extracted by the extraction circuit is positioned on an end portion in a horizontal direction of the region of field angle related to the frontward image.

2. The vehicle control device according to claim 1, wherein
when extracting the sub-region related to the defective image from the plurality of sub-regions, the extraction circuit included in the recognition circuit is configured to regard as a defective image a candidate image to be extracted whose difference in brightness or luminance with respect to a peripheral image is less than a predetermined threshold and to extract the sub-region related to the defective image from the plurality of sub-regions.

3. A vehicle control device comprising:

an information acquisition circuit configured to acquire information on a frontward image including a traveling road surface of a host vehicle, a recognition circuit configured to recognize a traveling environment of the host vehicle based on the frontward image acquired by the information acquisition circuit, and an autonomous driving control circuit configured to control autonomous driving including at least one of a speed control and a steering control of the host vehicle based on the traveling environment recognized by the recognition circuit, wherein the recognition circuit includes an extraction circuit configured to extract a defective image among the frontward images, the autonomous driving control circuit is configured to have a main function of limiting a function related to the defective image among a plurality of functions involved in the autonomous driving if the recognition circuit extracts the defective image, a region of field angle related to the frontward image of the host vehicle is divided into a plurality of sub-regions, to each of which one or more of the plurality of functions involved in the autonomous driving are assigned, the extraction circuit of the recognition circuit is configured to extract a sub-region related to the defective image from the plurality of sub-regions when extracting the defective image from the frontward images, the autonomous driving control circuit is configured to limit one or more functions assigned to the sub-regions related to the defective image, but to permit one or more functions assigned to the sub-regions related to the non-defective images that do not include the sub-region related to the defective image of the region of field angle related to the frontward image, if the sub-regions related to the defective image are extracted by the extraction circuit, and the autonomous driving control circuit is configured to stop a function of recognizing a traffic sign related to the front of the host vehicle, when the sub-region related to the defective image extracted by the extraction circuit is positioned on an upper portion in a vertical direction of the region of field angle related to the frontward image.

4. The vehicle control device according to claim 3, wherein when extracting the sub-region related to the defective image from the plurality of sub-regions, the extraction circuit included in the recognition circuit is configured to regard as a defective image a candidate image to be extracted whose difference in brightness or luminance with respect to a peripheral image is less than a predetermined threshold and to extract the sub-region related to the defective image from the plurality of sub-regions.

* * * * *